(12) United States Patent
Hartwig et al.

(10) Patent No.: US 9,781,394 B2
(45) Date of Patent: Oct. 3, 2017

(54) LIGHTING DEVICE HAVING PHOSPHOR WHEEL AND EXCITATION RADIATION SOURCE

(71) Applicant: OSRAM GmbH, Munich (DE)

(72) Inventors: Ulrich Hartwig, Berlin (DE); Klaus Finsterbusch, Berlin (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/908,568

(22) PCT Filed: May 28, 2014

(86) PCT No.: PCT/EP2014/061063
§ 371 (c)(1),
(2) Date: Jan. 29, 2016

(87) PCT Pub. No.: WO2015/014513
PCT Pub. Date: Feb. 5, 2015

(65) Prior Publication Data
US 2016/0165194 A1    Jun. 9, 2016

(30) Foreign Application Priority Data
Jul. 31, 2013    (DE) .................. 10 2013 215 054

(51) Int. Cl.
*H04N 9/31* (2006.01)
*G02B 26/00* (2006.01)
(Continued)

(52) U.S. Cl.
CPC ......... *H04N 9/3111* (2013.01); *G02B 26/008* (2013.01); *G03B 21/204* (2013.01);
(Continued)

(58) Field of Classification Search
CPC .. G03B 21/14; G03B 21/204; G03B 21/2013; H04N 9/3111; H04N 9/3161; H04N 9/3164
See application file for complete search history.

(56) References Cited

U.S. PATENT DOCUMENTS 9,146,452 B2 *   9/2015   Guthrie ................ G03B 21/204
9,170,423 B2 *  10/2015   Mehl ....................... F21V 13/02
(Continued)

FOREIGN PATENT DOCUMENTS

CN    102385233 A    3/2012
DE   102011087112 A1   5/2013
(Continued)

OTHER PUBLICATIONS

International Search Report based on application No. PCT/EP2014/061063 (4 pages) dated Aug. 7, 2014 (for reference purpose only).

*Primary Examiner* — Sultan Chowdhury
(74) *Attorney, Agent, or Firm* — Viering, Jentschura & Partner mbB

(57) ABSTRACT

Various embodiments may relate to a lighting device, including an excitation radiation source and a two-sided luminescent-material wheel. At least one luminescent material is provided on each of the two sides of the two-sided luminescent-material wheel, thus both on the front side and on the opposite back side. The luminescent materials on both sides are excited sequentially in time. For this purpose, at least one transmissive region is provided in the rotating luminescent-material wheel, through which transmissive region the excitation radiation can radiate, which excitation radiation can be deflected onto the luminescent material on the back side by means of an optical unit.

17 Claims, 6 Drawing Sheets

(51) Int. Cl.
    *G03B 21/20*     (2006.01)
    *G03B 33/08*     (2006.01)

(52) U.S. Cl.
    CPC ........... *G03B 33/08* (2013.01); *H04N 9/3117* (2013.01); *H04N 9/3158* (2013.01); *H04N 9/3161* (2013.01)

(56) References Cited

U.S. PATENT DOCUMENTS

| | | | |
|---|---|---|---|
| 2007/0019408 A1* | 1/2007 | McGuire, Jr. | F21S 10/007 362/231 |
| 2010/0245777 A1 | 9/2010 | Ogura | |
| 2012/0243205 A1 | 9/2012 | Lin | |
| 2012/0300178 A1* | 11/2012 | Sugiyama | H04N 9/3111 353/31 |
| 2013/0021582 A1 | 1/2013 | Fujita et al. | |
| 2013/0088471 A1* | 4/2013 | Kitano | H04N 9/3114 345/208 |
| 2014/0140038 A1* | 5/2014 | Gerets | G03B 21/16 362/84 |
| 2014/0328044 A1 | 11/2014 | Mehl et al. | |

FOREIGN PATENT DOCUMENTS

| | | |
|---|---|---|
| EP | 2530520 A1 | 12/2012 |
| EP | 2014/061063 A1 | 8/2014 |
| JP | 2011070088 A | 4/2011 |

* cited by examiner

LIGHTING DEVICE HAVING PHOSPHOR WHEEL AND EXCITATION RADIATION SOURCE

RELATED APPLICATIONS

The present application is a national stage entry according to 35 U.S.C. §371 of PCT application No.: PCT/EP2014/061063 filed on May 28, 2014 which claims priority from German application No.: 10 2013 215 054.7 filed on Jul. 31, 2013, and is incorporated herein by reference in its entirety.

TECHNICAL FIELD

Various embodiments may relate to a lighting device having an excitation radiation source and a phosphor wheel for converting at least part of the excitation radiation into wavelength-converted radiation, the latter usually in the visible range of the electromagnetic spectrum ("conversion light").

Such a lighting device is useable, in particular, as a light-generating unit in a projector, e.g. for video projectors or data projectors.

Various embodiments also relate to a method for operating the lighting device.

BACKGROUND

The related art, for example the document US 2010/0245777 A1, discloses lighting devices for projection applications which include a disk-shaped phosphor wheel having one or more phosphors. In this case, said lighting devices include an excitation radiation source, which excites the phosphor to emit light having a different wavelength than the excitation radiation wavelength (wavelength conversion of the excitation radiation by means of phosphor). The phosphors are usually arranged successively in the direction of rotation on one side of the phosphor wheel, such that the light (converted light) emitted by the respective phosphor is generated temporally sequentially and fed to the imaging system.

Lasers, for example laser diodes, are preferably used as the excitation radiation source. In this case, the technology is also known by the designation LARP ("Laser Activated Remote Phosphor").

The document CN 102385233 A discloses a lighting device for a projector including an excitation laser, a phosphor wheel for the wavelength conversion of the excitation laser light into conversion light, and a filter wheel, for spectrally filtering the conversion light. The excitation laser light is directed onto the phosphor wheel with the aid of a dichroic mirror. The conversion light reflected back from the phosphor wheel passes through the dichroic mirror and impinges on the filter wheel. The excitation laser light can pass through a transparency segment in the phosphor wheel and is fed to the dichroic mirror via a wraparound loop. The dichroic mirror reflects the excitation laser light to the filter wheel. The filter wheel and the phosphor wheel are arranged on a common axis and thus rotate synchronously at the same speed. In this way, the conversion light generated sequentially by a phosphor segment of the phosphor wheel is spectrally filtered by an assigned filter segment of the filter wheel.

The document EP 2 530 520 A1 discloses a lighting device for use in a projector. The lighting device includes a phosphor wheel coated on one side, said phosphor wheel consisting of a transparent circular-disk-shaped carrier material, three quarters of the front side of which is coated with various phosphors. The uncoated quarter serves as a transparent segment. The laser radiation is radiated through said transparent segment and deflected via mirrors onto the rear side of the phosphor wheel, where the laser beam passes through the transparent carrier material and excites a blue phosphor—applied behind the latter on the front side in one quarter segment—to emit blue light. The blue phosphor conversion therefore takes place in transmission. The other two quarter segments are coated with green phosphor. The green phosphor conversion takes place here in reflection. However, a reflection layer is required between each phosphor layer and the transparent carrier material in order that the light converted by the respective phosphor can be emitted from the front side and combined in a common direction. Otherwise, part of the converted light would be lost through the transparent substrate in the opposite direction. At least for the blue phosphor segment (transmission mode), the reflection layer must additionally be transmissive to the laser radiation. Red light from a separate light emitting diode (LED) is admixed for the red light channel.

The document US 2012/0243205 A1 likewise discloses a lighting device for use in a projector. In one variant, a phosphor wheel runs in a slot in a curved reflector, specifically through the focal point thereof. The phosphor wheel has on both sides, i.e. both on one side and on the other side of the usually circular carrier disk of the phosphor wheel, a region provided with phosphor. The light intensity of the arrangement is intended to be increased as a result. However, two separate excitation radiation sources are provided for this purpose, wherein each of the two sides of the phosphor wheel is irradiated through corresponding openings in the reflector in the region of the focal point with the aid of a respective excitation radiation source.

SUMMARY

Various embodiments provide a lighting device, in particular a lighting device for projection applications, having as efficient, compact and cost-effective a configuration as possible.

A further aspect of the present disclosure is the possibility of generating, in contrast to the related art, a temporally sequential sequence of differently filtered conversion light even without a filter wheel, but rather with at least one static filter.

Various embodiments provide a lighting device, including an excitation radiation source for the emission of excitation radiation, a phosphor wheel, including a carrier substrate having a front side and a rear side, wherein the phosphor wheel is arranged in a beam path of the excitation radiation such that the excitation radiation can pass onto the front side, and wherein the phosphor wheel furthermore includes the following: at least one phosphor arranged on the front side and serving for irradiation with excitation radiation and wavelength conversion of the excitation radiation into wavelength-converted radiation, at least one phosphor arranged on the rear side and serving for irradiation with excitation radiation and wavelength conversion of the excitation radiation into wavelength-converted radiation, a first region transmissive to the excitation radiation, said first region being designed to the effect that the excitation radiation can pass onto the rear side, and wherein the lighting device furthermore includes an optical device, which is designed to deflect the excitation radiation that irradiates the front side of the carrier substrate and radiates through the first transmissive region thereof onto the rear side of the carrier substrate.

In addition, various embodiments provide a method for operating the lighting device according to the present disclosure.

The features, advantages and modes of operation described below for the lighting device according to the present disclosure and the configuration possibilities thereof hold true, if applicable, in an analogous way for the method according to the present disclosure as well, and vice versa.

The basic concept of the present disclosure consists in providing, on both sides of a disk-shaped phosphor wheel, that is to say both on the "front side" and on the opposite "rear side", in each case at least one phosphor and in exciting these phosphors on both sides temporally sequentially, i.e. in irradiating the front and rear sides of this "two-sided phosphor wheel" alternately with the excitation radiation.

The conversion of the excitation radiation into conversion light preferably takes place from a shorter wavelength to a longer wavelength ("down conversion"), since this does not require any additional energy. In this case, therefore, the wavelength of the excitation radiation is shorter than the wavelengths of the conversion light. By way of example, the excitation radiation of the excitation radiation source may include a blue laser radiation and/or blue-violet and/or ultraviolet laser radiation.

A blue laser radiation as excitation radiation has the advantage that part can be concomitantly used as blue light without being converted (wraparound light path). A blue phosphor for the blue light channel is therefore not required in this case.

Lasers are particularly preferred as excitation radiation source on account of the high power densities possible therewith. One suitable laser device may include in particular at least one semiconductor laser, in particular diode laser or laser diode. Moreover, a plurality of laser diodes of identical type and/or different laser diodes can be operated jointly in groups, e.g. as a stack ("laser stack") or matrix.

A phosphor can be understood to mean any, in particular solid, substance which enables the wavelength conversion. The wavelength conversion can be based on fluorescence or phosphorescence, for example. The phosphor regions can be identical or else different on the front side and on the rear side of the carrier substrate of the phosphor wheel—depending on the application.

The phosphors on the front side and/or rear side and the at least one transmissive region of the carrier substrate which is provided for the irradiation of the rear side may be embodied as annular segments.

The annular segments on both sides can also be arranged on different radii on the front side and/or rear side. As a result, more free space is obtained for the different design of the phosphor segments. If the annular segments on both sides are on the same radius, the phosphor segments on both sides are necessarily of the same size for the same angular extent.

In order to be able to irradiate not only the front side but also the rear side of the phosphor wheel with the excitation radiation, the carrier substrate has a first region transmissive to the excitation radiation. As a result, the excitation radiation impinging on the front side can be deflected through the transmissive region and onto the rear side. In this way, the excitation radiation is radiated temporally sequentially onto the front side and rear side, respectively, of the phosphor wheel. With the aid of phosphors, for example in the form of phosphor segments, applied on both sides on the phosphor wheel, this results in both a front-side conversion light path and a rear-side conversion light path.

By means of a corresponding segment division of the phosphor wheel, that is to say at least one transmissive segment and on both sides in each case at least one phosphor segment, three different light paths can be traversed in a specific temporal sequence:
  a path for the excitation light that alternately irradiates the front side and rear side (front- and rear-side excitation light path, respectively),
  a path for the light converted by a phosphor segment on the front side (front-side conversion light path),
  a path for the light converted by a phosphor segment on the rear side (rear-side conversion light path).
  Optional: an additional path for the excitation radiation if said excitation radiation is blue light and the phosphor wheel has two further transmissive segments (wraparound light path).

One or both conversion light paths may have a static filter (wavelength or polarization filter). On account of the two conversion light paths, in contrast to the prior art, a temporally sequential sequence of differently filtered conversion light is possible even without a filter wheel, instead with at least one static filter.

By way of example, a green phosphor can be provided on the front side and a yellow phosphor on the rear side of the phosphor wheel. Although the broadband conversion spectrum of the yellow phosphor has its centroid in the yellow spectral range, this also has winglike edge regions into the red spectral range. Therefore, by way of example, the yellow light converted on the rear side can be filtered by a suitable filter to form red light. The green light converted on the front side can be filtered differently or else remain spectrally unfiltered.

In a further embodiment, a yellow phosphor can be provided on the front side and a green and a red phosphor on the rear side of the phosphor wheel. Now, with the aid of a suitably designed band-stop filter that filters out the longer wavelengths of the green conversion light and the shorter wavelengths of the red conversion light, it is possible to alter the spectrum of the rear-side conversion light such that the color space spanned thereby is extended.

Various embodiments consist, inter alia, in the fact that no second wheel (=filter wheel) has to be synchronized with the phosphor wheel. Moreover, static filters can be arranged at locations at which the light is almost parallel. As a result, steep filter edges can be implemented by dichroic layers. Furthermore, in the case of the solution according to the present disclosure with one or a plurality of static filters, there is no occurrence of a spoke effect caused by a filter wheel (passage of the excitation beam through the rotating transition from one color filter segment to the other). The first or else each region transmissive to the excitation radiation in the phosphor wheel can be formed by an opening in the carrier substrate, for example in the form of a perforated annular segment. The opening can also be filled with transparent or translucent material.

While the first region transmissive to the excitation radiation is provided for the irradiation of a phosphor segment on the rear side of the phosphor wheel, the carrier substrate can optionally have a second and third region transmissive to the excitation radiation, said second and third regions being provided for a wraparound light path for the in this case preferably blue excitation light. The two additional transmissive regions are designed such that the excitation radiation irradiating the front side of the carrier substrate can radiate through the second transmissive region of the carrier substrate. With the aid of the optical device, the excitation radiation radiating through is deflected onto the rear side of the phosphor wheel and thus radiates through the third transmissive region of the carrier substrate, i.e. passes again onto the front side of the phosphor wheel. There it can be guided to the light output or brought together with the conversion light paths on both sides by means of suitable optical elements. For further details, reference should be made to the exemplary embodiments.

The first and/or a further or else each transmissive region can also be provided with a color or polarization filter or a polarization-rotating optical element. The optical device can be designed such that the conversion light emitted by a phosphor on the rear side of the carrier substrate (="rear-side conversion light") radiates back through the first transmissive region of the phosphor wheel. In this case, therefore, the rear-side conversion light returns on the light path of the excitation radiation via the same optical elements of the optical device in the opposite direction. In this way, the rear-side conversion light, by means of the optical device, can be directed back through the first transmissive region onto the front side of the phosphor wheel and thus be coupled onto the front-side conversion light path, that is to say temporally sequentially with respect to the front-side conversion light. As a result, the front-side conversion light path is therefore used alternately by the front-side and rear-side conversion light, respectively.

Alternatively, the optical device may include a dichroic mirror that branches off the conversion light emitted by a phosphor on the rear side of the carrier substrate of the phosphor wheel from the excitation radiation in the opposite direction. For this purpose, the dichroic mirror is designed to be reflective for the excitation radiation and transmissive for the rear-side conversion light in the opposite direction. In this case, therefore, the rear-side conversion light need no longer be directed back through the first transmissive region of the carrier substrate.

The optical device preferably includes at least one optical element which acts as a deflection mirror for the excitation radiation and the rear-side conversion light. A filter element can be arranged in the beam path of the conversion light emitted from the rear side of the carrier substrate, i.e. in the rear-side conversion light path. The filter element can be designed as a wavelength- and/or polarization-dependent filter.

For coupling out the front-side conversion light, an optical element can be arranged in the beam path between excitation radiation source and front side of the carrier substrate of the phosphor wheel, i.e. in the front-side conversion light path, said optical element branching off the conversion light in a direction different than the opposite excitation radiation direction. For this purpose, the optical element can be designed as a dichroic mirror that transmits the excitation radiation and reflects the conversion light, or vice versa. The spectrum of the conversion light can also be varied as necessary by said dichroic mirror.

Moreover, provision can be made of an optical integrator for feeding in and spatially homogenizing the conversion light and optionally additionally the excitation light.

The lighting device described above can be used in a projector, for example. For this purpose, the sequentially generated light is usually directed into an optical integrator and from there onto an imaging unit. For the sequential generation of the color sub-images, the imaging unit is synchronized with the phosphor wheel. The color sub-images are projected onto a projection surface by means of a projection optical unit.

A method for operating the lighting device according to the present disclosure includes the following method steps:
front-side conversion phase: irradiating the at least one phosphor arranged on the front side of the carrier substrate of the rotating phosphor wheel with the excitation radiation,
rear-side conversion phase: causing the excitation radiation to radiate through the first transmissive segment from the front side and deflecting the transmitted excitation radiation onto the at least one phosphor arranged on the rear side of the carrier substrate of the rotating phosphor wheel.

If blue light is used as excitation radiation, the following method step can also be added:
wraparound phase: causing the excitation radiation to radiate through the second transmissive segment in a manner coming from the front side, deflecting the transmitted excitation radiation onto the third transmissive segment, and causing the deflected excitation radiation to radiate through the third transmissive segment in a manner coming from the rear side.

The front- and rear-side conversion light sequentially generated on account of the rotating phosphor wheel, and optionally additionally the blue excitation light, are combined in a common direction by means of optical elements, for example deflection and/or dichroic mirrors and lenses, and are directed into an optical integrator, for example.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Features that are identical or of identical type may also be designated by identical reference signs below for the sake of simplicity.

Figure 1:
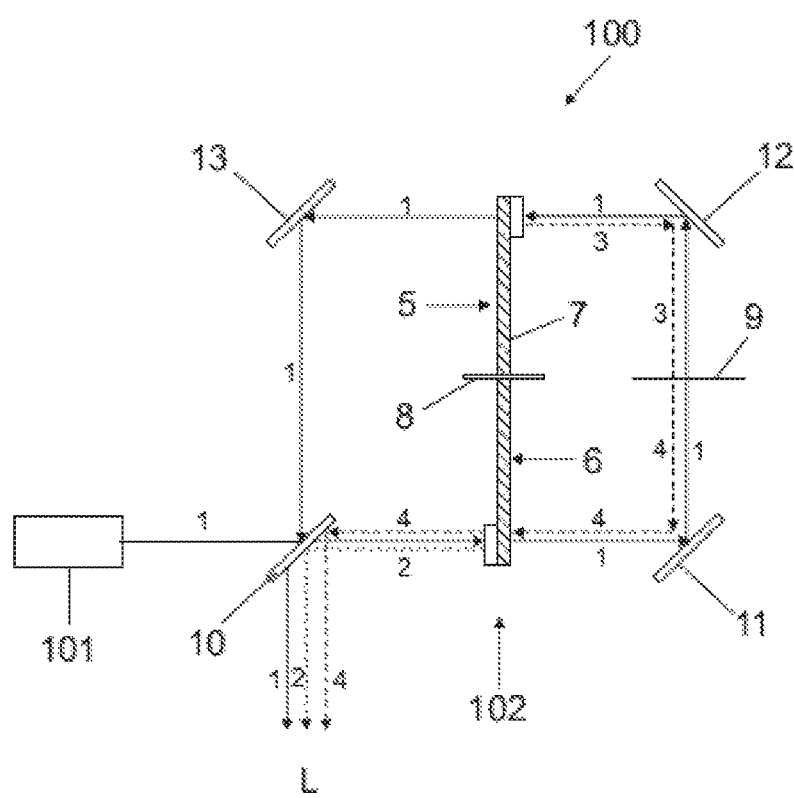
FIG. 1 shows a lighting device including a two-sided phosphor wheel in accordance with a first embodiment.

FIG. 1 shows a schematic illustration of a lighting device 100 in accordance with a first exemplary embodiment of the present disclosure. For the sake of better clarity, the optical lenses for beam shaping that are customary in such devices are not depicted in FIG. 1 (but in this respect see FIG. 3). Moreover, the optical beam paths are merely indicated schematically.

The lighting device 100 includes a laser device 101 as excitation radiation source. The laser device 101 is designed to emit laser light in the blue spectral range since, firstly, this constitutes a suitable excitation wavelength for most phosphors. Secondly, this makes it possible to use the unconverted blue laser light (wraparound light path) as a blue light channel (B), for example for an RGB projection unit. The emission wavelength of the blue laser radiation 1 is preferably in the range of e.g. approximately 400-470 nm. The excitation radiation source 101 can be embodied for example as a laser diode matrix having a plurality of laser diodes.

The blue laser light 1 (=excitation light)—after it has passed through a dichroic mirror 10—is focused onto a phosphor wheel 102 by means of an optical lens system (not illustrated in FIG. 1). The phosphor wheel 102 has a circular-disk-shaped carrier substrate 7 with a rotation spindle 8 arranged perpendicularly and centrally with respect thereto. The carrier substrate 7 consists of metal, for example, in order to enable good dissipation of the heat loss from the phosphor conversion.

Figure 2A:
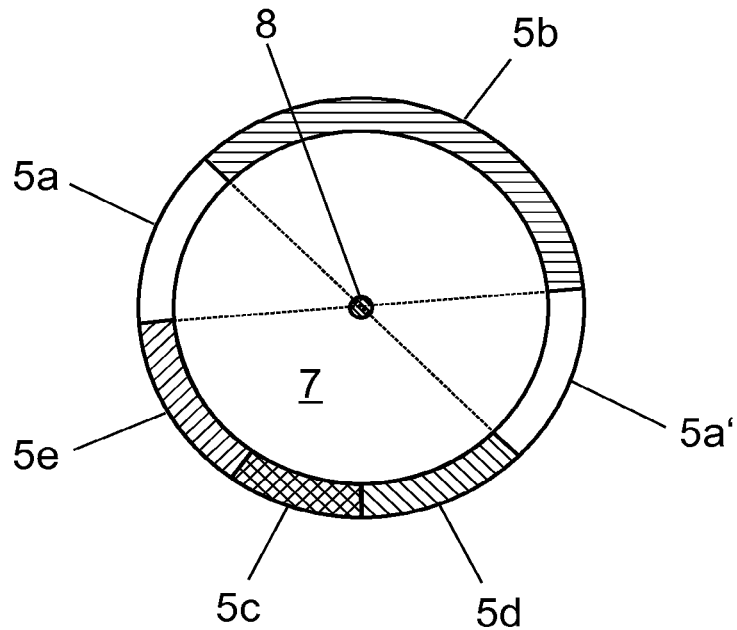
FIG. 2A shows the front side of the phosphor wheel in accordance with FIG. 1.
Figure 2B:
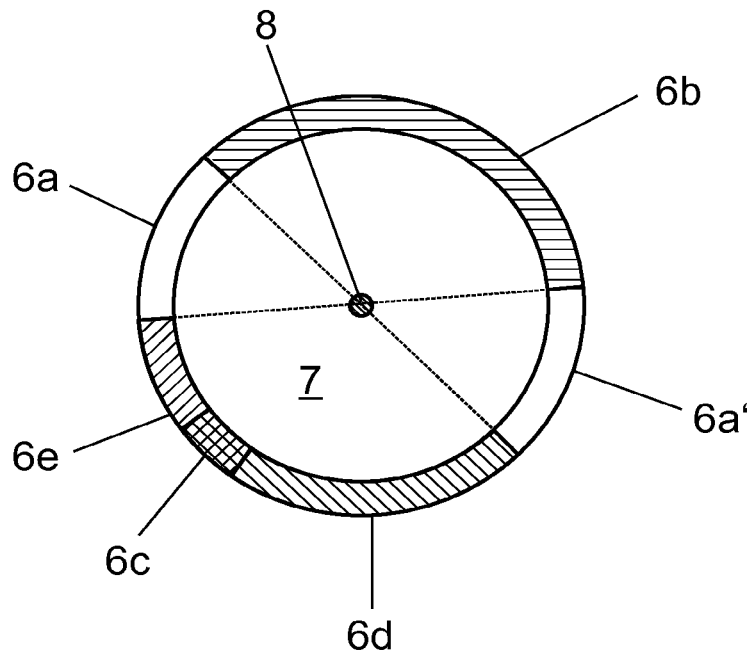
FIG. 2B shows the rear side of the phosphor wheel in accordance with FIG. 1.

Reference will now also be made below to FIGS. 2A, 2B, which show the phosphor wheel 102 in a schematic illustration, specifically the front side 5 and rear side 6, respectively. The planar front side 5 of the carrier substrate 7 of the phosphor wheel 102, said front side being irradiated by the impinging laser light 1 during the front-side conversion phase, has an annular region subdivided into six annular segments 5a-5e and 5a'. The three segments 5a, 5a' and 5b are embodied as transparent to the blue laser light 1, specifically in the form of through openings in the metallic carrier substrate. The segments 5c-5e are coated with phosphor, for example for the sequential wavelength conversion of the blue laser light 1 into yellow light (by means of yellow phosphor), green light (by means of green phosphor) and cyan-colored light (by means of cyan phosphor). Depending on the desired colored light sequence, the phosphor segments 5c to 5e may include the same phosphor or else different phosphors. The planar rear side 6 of the carrier substrate 7 of the phosphor wheel 102, said rear side being irradiated by the laser light 1 during the rear-side conversion phase, likewise has an annular region subdivided into six annular segments 6a-6e and 6a'. The three segments 6a, 6a' and 6b (=rear side of the through openings) are the counterparts to the three segments 5a, 5a' and 5b of the front side and are therefore necessarily likewise transparent to the blue laser light 1. The segment 6c is coated with a yellow phosphor, for example. Depending on the desired colored light sequence, the phosphor segments 6d and 6e may include the same phosphor or else different phosphors.

During operation, the blue laser light 1 impinges on a phosphor segment 5c, 5d, 5e on the front side 5 of the phosphor wheel 102 during a corresponding rotation phase of the rotating phosphor wheel 102. The backscattered converted light 2 wavelength-converted by the currently irradiated phosphor segment of the front side is reflected out of the laser light path 1 by the dichroic mirror 10 toward the light output L for the further use in accordance with the application. In this case, the spectrum of the converted light 2 can be influenced in a targeted manner by the design of the spectral properties of the dichroic mirror 10; the light color can thus be varied as required.

Alternatively, the dichroic mirror 10 can be embodied as reflective for the blue laser light 1 and transmissive for the converted light 2. In that case, the laser light source 101 and the light output L have to swap places and the tilting angle of the dichroic mirror 10 has to be adapted (not illustrated).

If the blue laser light 1 impinges on the transparent segment 5b (or 6b) during a corresponding rotation phase of the rotating phosphor wheel 102, it is deflected onto the rear side of the phosphor wheel via two mirrors 11, 12. During this rear-side conversion phase, the deflected blue laser light 1 impinges on the rear-side phosphor segments 6c-6e rotating through. The converted light 3 (rear-side conversion light) backscattered from the rear-side phosphor segments 6c-6e passes on the same light path back to the dichroic mirror 10, where it is reflected out of the laser light path 1 in the direction of the light output L.

Preferably, a wavelength filter 9 is arranged in the rear-side light path in order to modify the spectrum of the light 3 converted on the rear side in a desired manner, i.e. to obtain light 4 having an altered light color after passage through the wavelength filter 9. In particular, in this way, for example, the broadband conversion light converted by the yellow phosphor segment 6c can be filtered with the aid of the wavelength filter 9 to form red light (although the conversion light spectrum of the yellow phosphor has its centroid in the yellow spectral range, it has on both sides winglike edge regions into the green and red spectral ranges, respectively). As already mentioned for the light path for the light 2 converted on the front side, the spectrum of the light 4 converted on the rear side and filtered, if appropriate, can additionally be modified further as desired by means of the suitably designed spectral properties of the dichroic mirror 10.

If the blue laser light 1, during a corresponding rotation phase of the rotating phosphor wheel 102, on the front side, impinges on the transparent segment 5a or, after a 180° rotation of the phosphor wheel 102, on the transparent segment 5a', it radiates through there, is deflected onto the rear-side other transparent segment 6a' (or 6a) via the two mirrors 11, and likewise radiates through the latter again onto the front side of the phosphor wheel 102. Via a further mirror 13, the blue laser light 1 radiating through the phosphor wheel 102 again is directed back onto the dichroic mirror 10 and passes through the latter to the light output L ("wraparound" light path for the blue laser light 1).

Figure 3:
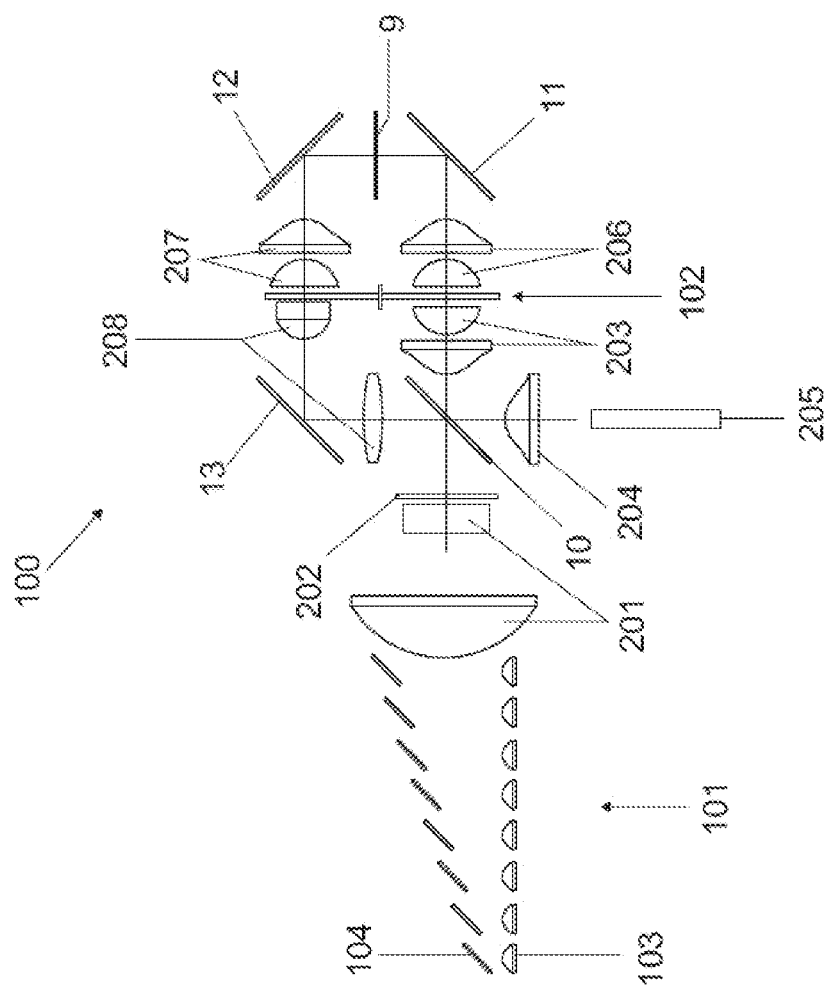
FIG. 3 shows the lighting device in accordance with FIG. 1 including optical lenses.

FIG. 3 shows the device 100 already shown in a simplified way in FIG. 1, here now with optical lenses for beam shaping. The laser device 101 is embodied for example as an 8 by 4 matrix including blue laser diodes 103 including primary lenses. Each of the 8 rows of 4 laser diodes is assigned a staircase mirror element 104, which deflects the blue laser light by 90° in the direction of the phosphor wheel 102. Moreover, the cross-sectional area of the laser beam is compressed in this way. A first optical lens group 201 disposed downstream compresses the laser beam further and collimates it.

A homogenizer 202 is arranged directly downstream of the first lens group 201 in order to obtain an as uniform as possible power density distribution of the blue laser light 1 on the phosphor segments of the phosphor wheel 102.

The collimated and homogenized laser light is focused onto the front side of the phosphor wheel 102 with the aid of a focusing lens group 203 (the laser focus need not necessarily lie exactly on the front side). Said focusing lens group 203 also collects and collimates the backscattered light (front-side conversion light) converted by the phosphor segments 5c-5e on the front side of the phosphor wheel 102, said light being coupled out to the light output L by the dichroic mirror 10. A focusing lens 204 finally focuses the coupled-out light into a rod-shaped optical integrator 205.

The laser light focused from the front side of the phosphor wheel 102 through a light-transmissive segment is collimated by a further lens group 206. Said lens group 206 additionally serves to focus the converted light (rear-side conversion light) backscattered from a phosphor segment on the rear side of the phosphor wheel 102 through a transmissive segment. The further light path of the light converted on the rear side then corresponds to that of the light converted on the front side.

A further focusing lens group 207 focuses the laser light collimated by the further lens group 206 onto the rear side of the phosphor wheel 102. Said further focusing lens group 207 also serves—in a similar manner to that in the case of the focusing lens group 203 on the front side—to collect and collimate the returning light converted by the phosphor segments on the rear side of the phosphor wheel 102. Finally, the further focusing lens group 207 also serves to focus the blue laser light from the rear side through a light-transmissive segment of the phosphor wheel 102. This transmitted blue laser light is collimated by means of a further lens system 208 and guided back onto the dichroic mirror 10 via a deflection mirror 13 ("wraparound" light path). The wraparound light path can alternatively also be led around the "upper" end of the phosphor wheel (not illustrated; therefore following explanation with reference to FIG. 1). In order to be able to split the light path of the laser light into a light path for irradiating the rear side and a light path for radiating around the phosphor wheel, polarized laser light is provided. Moreover, the deflection mirror 12 is embodied as polarization-dependent for the laser light, for example as reflective for S-polarized light and transmissive for P-polarized light. For temporally sequentially changing the polarization, a light-transmissive segment in the phosphor wheel is provided with a λ/2 filter. S-polarized blue laser light is then firstly converted into p-polarized light in the λ/2 filter segment and then transmitted by the mirror 12. The p-polarized blue light is led around the phosphor wheel 102 by an additional deflection mirror and is directed onto the dichroic mirror 10 via an offset deflection mirror 13.

The mirrors 11 and 12 on the rear side of the phosphor wheel 102 and the wavelength filter 9 can alternatively also be replaced by a dichroically coated elliptic reflector and/or suitable dichroically coated freeform reflector (not illustrated).

The segments transparent to the blue laser light can also be equipped in part with color or polarization filters or polarization-rotating optical elements. In this regard, both the blue laser light and the converted light can be manipulated further.

Figure 4:
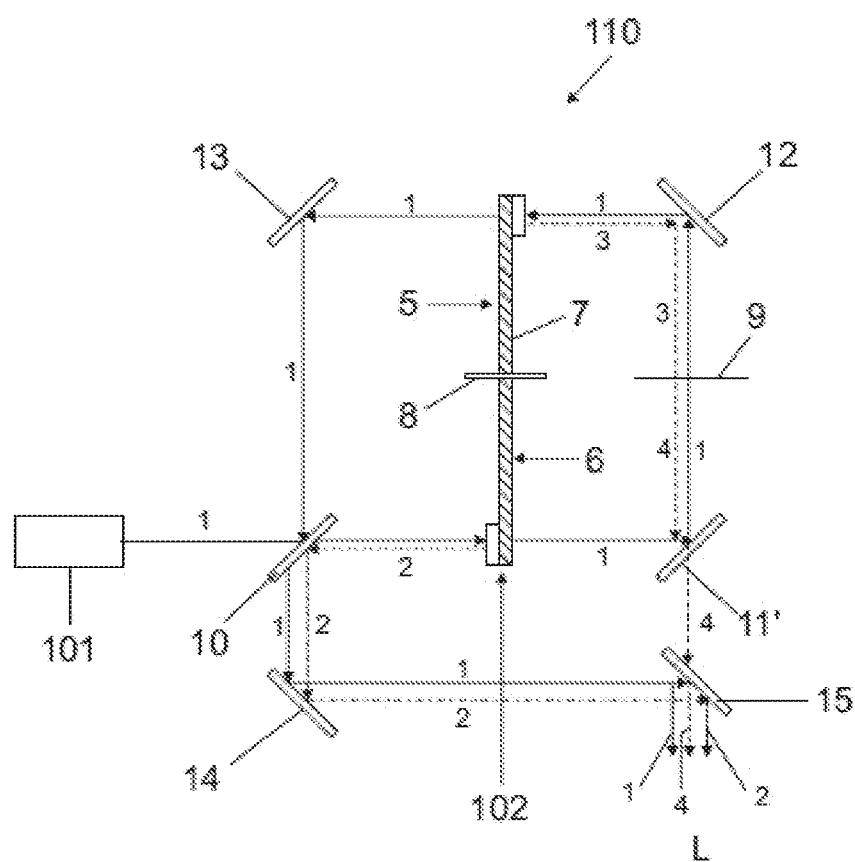
FIG. 4 shows a lighting device including a two-sided phosphor wheel in accordance with a second embodiment.

FIG. 4 shows a schematic illustration of a lighting device 110 in accordance with a second exemplary embodiment of the present disclosure. Here the light path for the light 3, 4 converted on the rear side is varied in comparison with the construction shown in FIG. 1. The mirror 11' is now embodied as a (second) dichroic mirror (high reflection (HR) 445-470 nm and antireflection (AR) 480-750 nm) that reflects the blue laser light, but transmits the converted light 4 (filtered by the wavelength filter 9). The light 4 converted on the rear side does not pass through the phosphor wheel 102 in this variant. Rather, the light 4 converted on the rear side is directed away from the laser light path 1, via the second dichroic mirror 11'. A deflection mirror 14 and a further (third) dichroic mirror 15 are provided for spatially combining the converted light originating from the front and rear sides. The deflection mirror 14 directs the light 2 converted on the front side and the blue laser light 1 from the wraparound light path onto the reflection side of the third dichroic mirror 15. The light 4 converted on the rear side is combined with the blue laser light 1 and the light 2 converted on the front side via the transmission side of the third dichroic mirror 15. Within the spectral ranges predefined by the third dichroic mirror 15, the light 2 converted on the front side and the light 4 converted on the rear side can be spectrally filtered independently of one another. The spectral filtering of the light 4 converted on the rear side can be effected by the wavelength filter 9 and/or the spectral properties of the second dichroic mirror 11'.

The lighting device 110 is suitable, for example, for generating a temporal sequence of red and green converted light by means of a phosphor wheel. For this purpose, by way of example, a green phosphor can be provided on the front side of the phosphor wheel and a yellow phosphor on the rear side. The green light converted on the front side can be spectrally altered as required by the first dichroic mirror 10. The converted yellow light originating from the rear side is filtered by the second dichroic mirror 11' to form red light.

Moreover, the lighting device 110 can be used in particular for 3D projection representations. In this case, the user requires spectacles coordinated with the spectral properties or polarization properties of the exciting laser light and the filters and/or dichroic mirrors.

With the use of specific properties of the light (wavelength, polarization), for the left and right sub-images, that is to say for the left eye and for the right eye, complementary filters are inserted into the 3D spectacles. Complementary here means that the image contents emitted by the 3D projector for the right eye and for the left eye can be decoded by the spectacle filters respectively inserted, such that a 3D effect arises for the viewer. Various methods can be employed here, such as the interference filter method (e.g. Dolby® 3D), the shutter spectacles method (e.g. XPAND 3D) or the polarizing filter method (e.g. RealD 3D).

Figure 5:
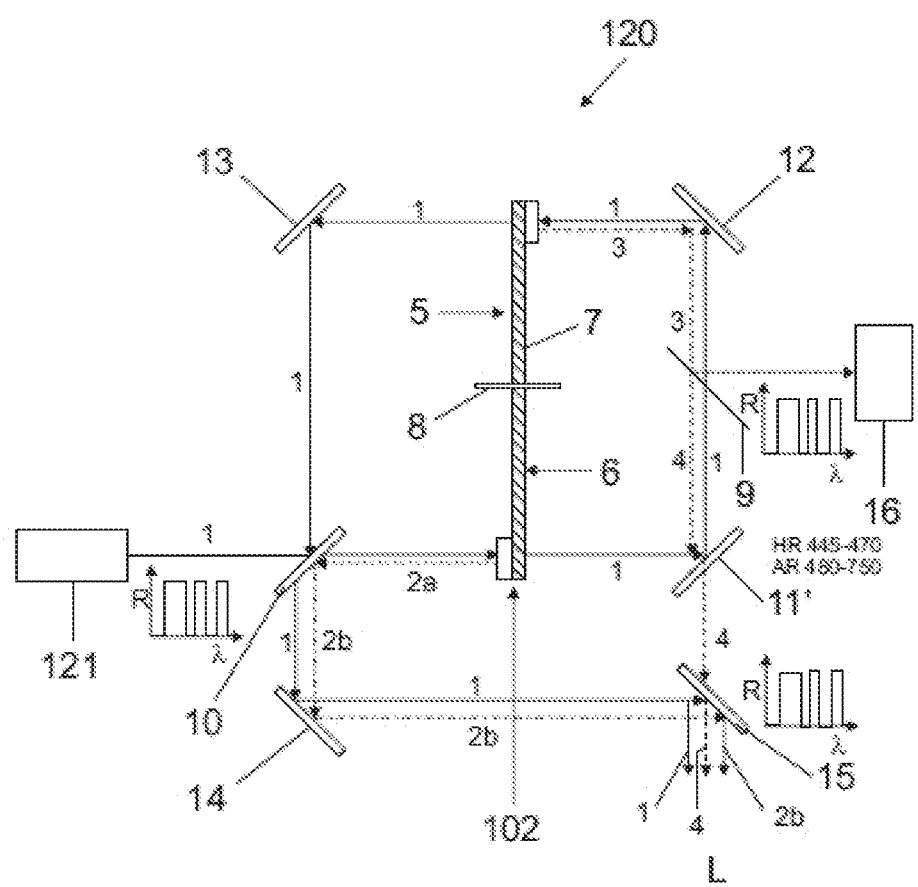
FIG. 5 shows a lighting device including a two-sided phosphor wheel in a variant adapted for 3D projection.

FIG. 5 shows a schematic illustration of a lighting device 120, which substantially corresponds to the lighting device 110 shown in FIG. 4 that is specifically adapted to the abovementioned interference filter method for 3D projection.

In this case, inter alia, two different wavelengths are used for the blue laser light. For this purpose, the excitation radiation source 121 includes two types of laser which emit laser radiation having two different laser wavelengths, e.g. 450 nm and 465 nm, wherein the two types of laser are switched electronically sequentially. Since the laser light is sufficiently narrowband, no wavelength filters are required. The first dichroic mirror 10 is designed to be transparent to the laser light (AR 445 nm-470 nm). The filters of the 3D spectacles transmit only the wavelength respectively provided for the left or right eye.

Moreover, the light converted on the front side is adapted to a first filter characteristic of 3D spectacles (e.g. for the right eye). For this purpose, the first dichroic mirror 10 is designed to be reflective with the first filter characteristic, i.e. in a manner appropriately matching the first filter of the 3D spectacles. The light 2a converted on the front side 5 of the filter wheel 102 is therefore reflected by the first dichroic mirror 10 in accordance with the first filter characteristic. The light 2b converted on the front side and filtered in this way passes via the deflection mirror 14 onto the third dichroic mirror 15, which is likewise designed to be reflective in accordance with the first filter characteristic and reflects the filtered light 26 converted on the front side in a manner without further spectral alteration. The light converted on the rear side is finally adapted to a second filter characteristic of 3D spectacles (e.g. for the left eye). This second filter characteristic is therefore complementary to the first filter characteristic in the sense explained above. For this purpose, the wavelength filter 9 is provided with the same coating as the first and third dichroic mirrors 10 and 15, respectively, and is arranged at an angle of 45° in the light path of the light 3 converted on the rear side. As a result, the wavelength filter 9 reflects in accordance with the first filter characteristic a part of the light 3 converted on the rear side, this part being taken up by an absorber 16. By contrast, that part of the light 4 converted on the rear side which corresponds to the inverted spectrum is transmitted by the wavelength filter 9, in a manner appropriately matching the second filter of the 3D spectacles. The light 4 converted on the rear side and filtered in accordance with the second filter characteristic in this way passes through the second dichroic mirror 11 (HR 445-470 nm and AR 480-750 nm) and is spatially combined, by means of the third dichroic mirror 15 (transmissive for inverted spectrum, in accordance with the second filter characteristic), with the blue laser light path (having two laser wavelengths) and the light 2b converted on the front side and filtered in accordance with the first filter characteristic.

Alternatively, it is also possible to dispense with the wavelength filter 9, to embody the first dichroic mirror 10 as highly reflective (HR) for 470 nm-700 nm and to embody only the third dichroic mirror 15 as an element impressing a filter characteristic. On both sides of the dichroic mirror 15, all the light colors provided then appear sequentially, in a manner filtered with the corresponding filter characteristic. With the aid of two projection devices (two of DMD, LCD and optical system), one respectively on each coupling-out side of the dichroic mirror 15, what can be achieved is that all of the light is used for the projection.

To differentiate between the two channels required for a 3D projection, it is also possible to employ polarization filters.

Figure 6A:
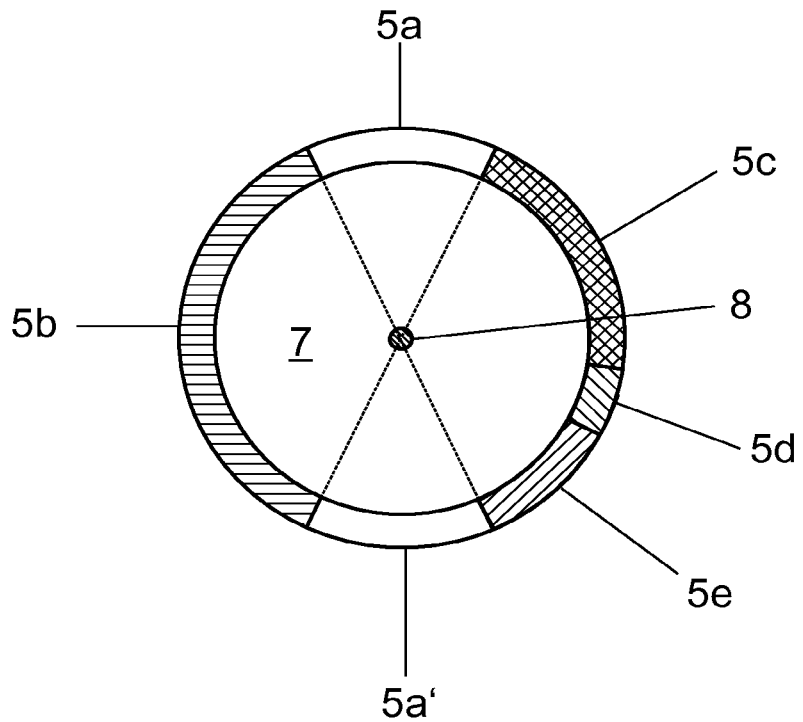
FIG. 6A shows the front side of the phosphor wheel in accordance with FIG. 5.
Figure 6B:
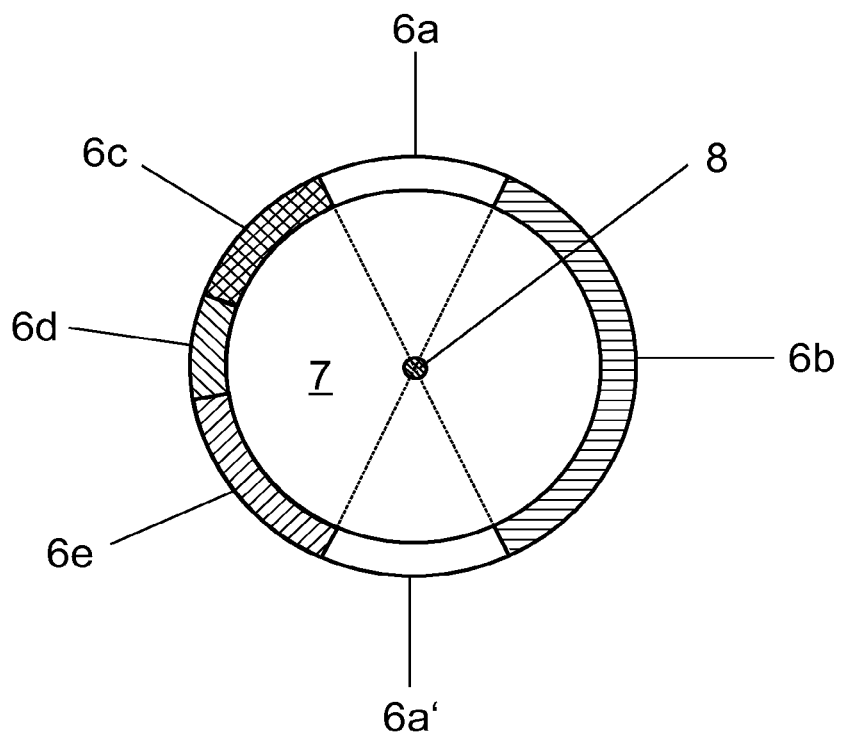
FIG. 6B shows the rear side of the phosphor wheel in accordance with FIG. 5.

FIGS. 6A, 6B show a phosphor wheel 5 suitable for the lighting device 120 from FIG. 5 and the double filtering provided there (both the light converted on the front side and the light converted on the rear side are spectrally filtered) in a schematic front and rear view, respectively.

Front and rear sides are in each case subdivided into six annular segments 5a-5e and 5a', and 6a-6e and 6a', respectively. The three segments 5a, 5a' and 5b, and 6a, 6a' and 6b, respectively, are embodied as transparent to the blue laser light 1. The segments 5c-5e and 6c-6e, respectively, are coated with green phosphor, yellow phosphor and red phosphor. Preferably, on the front and rear sides the phosphor divisions are identical or at most slightly different in order to compensate for different losses, if appropriate.

In the embodiments explained above, the angular positions of the mirrors are illustrated merely by way of example as 45° with respect to the incident light beam and can also be chosen differently.

The present disclosure proposes a lighting device (100) including an excitation radiation source (101) and a two-sided phosphor wheel (102). On both sides of the two-sided phosphor wheel (102), that is to say both on the front side (5) and on the opposite rear side (6), at least one phosphor is provided in each case. The phosphors on both sides are excited temporally sequentially. For this purpose, provision is made of at least one transmissive region in the rotating phosphor wheel through which the excitation radiation can radiate and can be directed onto the phosphor on the rear side (6) by means of an optical system (11, 12).

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting device, comprising:
   an excitation radiation source for the emission of excitation radiation,
   a phosphor wheel, comprising a carrier substrate having a front side and a rear side, wherein the phosphor wheel is arranged in a beam path of the excitation radiation such that the excitation radiation can pass onto the front side, and wherein the phosphor wheel further comprises:
      at least one phosphor arranged on the front side and serving for irradiation with excitation radiation and wavelength conversion of the excitation radiation into wavelength-converted radiation,
      at least one phosphor arranged on the rear side and serving for irradiation with excitation radiation and wavelength conversion of the excitation radiation into wavelength-converted radiation,
      a first region transmissive to the excitation radiation, said first region being designed to the effect that the excitation radiation can pass onto the rear side, and
   an optical device, which is designed to deflect the excitation radiation that irradiates the front side of the carrier substrate and radiates through the first transmissive region thereof onto the rear side of the carrier substrate; and
      wherein the optical device is designed such that the wavelength-converted radiation emitted by a phosphor on the rear side of the carrier substrate radiates counter to the excitation radiation back through the first transmissive region of the phosphor wheel.

2. The lighting device as claimed in claim 1, wherein the optical device comprises a dichroic mirror, which transmits the wavelength-converted radiation emitted by a phosphor on the rear side of the carrier substrate.

3. The lighting device as claimed in claim 1, wherein the optical device comprises at least one optical element which acts as a deflection mirror for the excitation radiation and the wavelength-converted radiation emitted by a phosphor on the rear side of the carrier substrate.

4. The lighting device as claimed in claim 1, further comprising a filter element arranged in the beam path of the wavelength-converted radiation emitted by the rear side of the carrier substrate.

5. The lighting device as claimed in claim 4, wherein the filter element is designed as a wavelength- and/or polarization-dependent filter.

6. The lighting device as claimed in claim 1, further comprising an optical element arranged in the beam path between excitation radiation source and front side of the carrier substrate of the phosphor wheel, said optical element being designed to transmit the excitation radiation and to reflect the wavelength-converted radiation, or vice versa.

7. The lighting device as claimed in claim 1, wherein the carrier substrate comprises a second and a third region transmissive to the excitation radiation, and the lighting device is designed such that the excitation radiation irradiating the front side of the carrier substrate radiates through the second transmissive region, is deflected onto the rear side of the carrier substrate with the aid of the optical device and radiates through the third transmissive region.

8. The lighting device as claimed in claim 1, wherein the excitation radiation source comprises a laser diode matrix.

9. The lighting device as claimed in claim 7, wherein the first or each transmissive region is formed by an opening in the carrier substrate.

10. The lighting device as claimed in claim 9, wherein the opening is filled with transparent or translucent material.

11. The lighting device as claimed in claim 7, wherein the first and/or a further or each transmissive region is provided with a color or polarization filter or a polarization-rotating optical element.

12. The lighting device as claimed in claim 1, wherein the lighting device is used in a projector for data or video projection.

13. A method for operating a lighting device,
the lighting device comprising:
an excitation radiation source for the emission of excitation radiation,
a phosphor wheel, comprising a carrier substrate having a front side and a rear side, wherein the phosphor wheel is arranged in a beam path of the excitation radiation such that the excitation radiation can pass onto the front side, and wherein the phosphor wheel further comprises:
at least one phosphor arranged on the front side and serving for irradiation with excitation radiation and wavelength conversion of the excitation radiation into wavelength-converted radiation, at least one phosphor arranged on the rear side and serving for irradiation with excitation radiation and wavelength conversion of the excitation radiation into wavelength-converted radiation, a first region transmissive to the excitation radiation, said first region being designed to the effect that the excitation radiation can pass onto the rear side, and
an optical device, which is designed to deflect the excitation radiation that irradiates the front side of the carrier substrate and radiates through the first transmissive region thereof onto the rear side of the carrier substrate,
the method comprising:
irradiating the at least one phosphor arranged on the front side of the carrier substrate of the rotating phosphor wheel with the excitation radiation, and causing the excitation radiation to radiate through the first transmissive segment from the front side and deflecting the transmitted excitation radiation onto the at least one phosphor arranged on the rear side of the carrier substrate of the rotating phosphor wheel;
further causing the excitation radiation to radiate through the second transmissive segment in a manner coming from the front side, deflecting the transmitted excitation radiation onto the third transmissive segment, and causing the deflected excitation radiation to radiate through the third transmissive segment in a manner coming from the rear side.

14. A lighting device, comprising:
an excitation radiation source for the emission of excitation radiation,
a phosphor wheel, comprising a carrier substrate having a front side and a rear side, wherein the phosphor wheel is arranged in a beam path of the excitation radiation such that the excitation radiation can pass onto the front side, and wherein the phosphor wheel further comprises:
at least one phosphor arranged on the front side and serving for irradiation with excitation radiation and wavelength conversion of the excitation radiation into wavelength-converted radiation,
at least one phosphor arranged on the rear side and serving for irradiation with excitation radiation and wavelength conversion of the excitation radiation into wavelength-converted radiation,
a first region transmissive to the excitation radiation, said first region being designed to the effect that the excitation radiation can pass onto the rear side, and
an optical device, which is designed to deflect the excitation radiation that irradiates the front side of the carrier substrate and radiates through the first transmissive region thereof onto the rear side of the carrier substrate; wherein the carrier substrate comprises a second and a third region transmissive to the excitation radiation, and the lighting device is designed such that the excitation radiation irradiating the front side of the carrier substrate radiates through the second transmissive region, is deflected onto the rear side of the carrier substrate with the aid of the optical device and radiates through the third transmissive region.

15. The lighting device as claimed in claim 14, wherein the first or each transmissive region is formed by an opening in the carrier substrate.

16. The lighting device as claimed in claim 15, wherein the opening is filled with transparent or translucent material.

17. The lighting device as claimed in claim 14, wherein the first and/or a further or each transmissive region is provided with a color or polarization filter or a polarization-rotating optical element.

* * * * *

UNITED STATES PATENT AND TRADEMARK OFFICE
CERTIFICATE OF CORRECTION

PATENT NO. : 9,781,394 B2
APPLICATION NO. : 14/908568
DATED : October 3, 2017
INVENTOR(S) : Ulrich Hartwig et al.

Page 1 of 1

It is certified that error appears in the above-identified patent and that said Letters Patent is hereby corrected as shown below:

In the Specification

Column 8, Line 35: Please delete "11, and" and insert -- 11, 12 and -- in place thereof.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*